United States Patent [19]

Fischer

[11] Patent Number: 4,533,874
[45] Date of Patent: Aug. 6, 1985

[54] DIGITAL FSK DEMODULATOR USING NON-RECURSIVE TRANSVERSAL FILTER

[75] Inventor: Reinhard Fischer, Munich, Fed. Rep. of Germany

[73] Assignee: Siemens Aktiengesellschaft, Berlin and Munich, Fed. Rep. of Germany

[21] Appl. No.: 379,479

[22] Filed: May 18, 1982

[30] Foreign Application Priority Data

May 29, 1981 [DE] Fed. Rep. of Germany ....... 3121444

[51] Int. Cl.$^3$ .................. H03D 3/00; H03K 9/06; G06F 7/544
[52] U.S. Cl. .................................. 329/50; 329/104; 329/110; 364/724; 375/88; 375/94
[58] Field of Search ............... 329/50, 104, 107, 110, 329/120; 364/724; 375/88, 94

[56] References Cited

U.S. PATENT DOCUMENTS 4,423,488 12/1983 Campbell ........................... 364/724
4,484,299 11/1984 Lambourn et al. ................. 364/724

FOREIGN PATENT DOCUMENTS 0066229 12/1982 European Pat. Off. ........... 329/104
0032057  3/1979 Japan ................................. 329/104
0109025  8/1980 Japan ................................. 364/724

OTHER PUBLICATIONS

Doctoral Thesis by G. Roupp, "The Demodulation of Frequency Shift-Keyed Signals with Band Widths in the Order of the Center Frequency", University of Stuttgart, 1975, pp. 35 through 39 and pp. 123 through 125.

Primary Examiner—Eugene R. LaRoche
Assistant Examiner—D. C. Mis
Attorney, Agent, or Firm—Herbert L. Lerner; Laurence A. Greenberg

[57] ABSTRACT

Method for demodulating FSK signals in which zero crossings of the FSK signals are detected and processed further. A FSK demodulator including an address-generating logic and a memory connected to the address-generating logic. The FSK signals are delivered to the input side of and control the address-generating logic. At a system clock frequency, the necessary address sequence is supplied to the memory for reading out a pulse reply from the memory for each zero-crossing of the FSK signal. In the memory are stored time-sequential values of a pulse reply having a given duration which emulate the output of a digital non-recursive transversal filter having lowpass transfer characteristic upon an input pulse of given duration. The address generating logic supplies a definite counting address to each zero crossing on the input side which is not yet assigned to another zero crossing. The counting address sequentially assumes all sequence values for the given duration which are necessary for reading out the pulse reply from the memory and which last sequence value assumes a rest value after the completion of the read out process. Data read out from the memory during a given system clock period is summed up.

5 Claims, 11 Drawing Figures

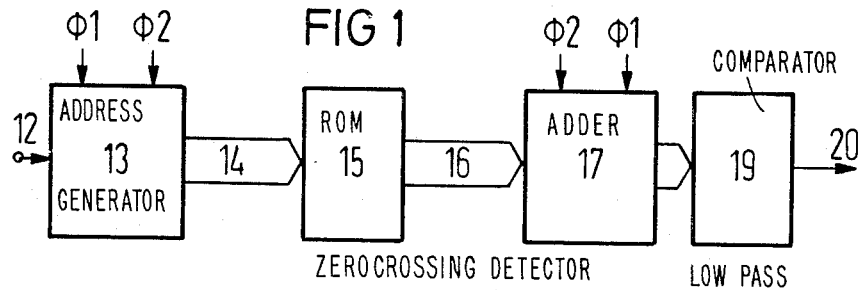
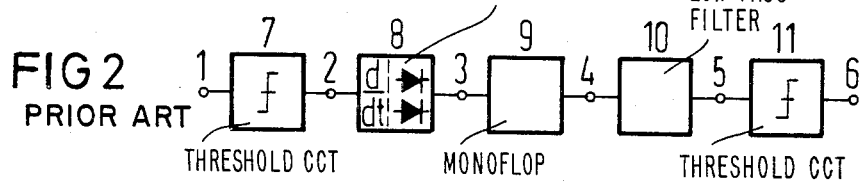
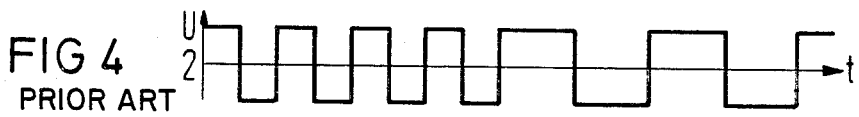
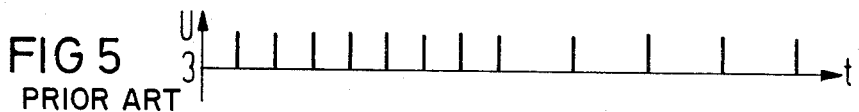
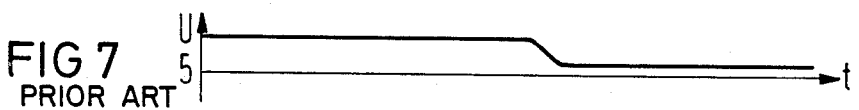
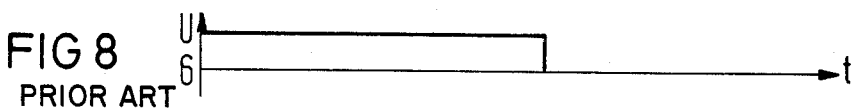

DIGITAL FSK DEMODULATOR USING NON-RECURSIVE TRANSVERSAL FILTER

The invention relates to a method and apparatus for demodulating FSK (Frequency Shift-Keyed) signals, in which the zero crossings of the FSK signals are determined and processed further.

Methods for demodulating FSK signals (Frequency Shift-Keyed signals) are known, for instance, from the doctoral thesis by G. Ruopp, "The Demodulation of Frequency Shift-Keyed Signals with Band Widths in the Order of Magnitude of the Center Frequency," University of Stuttgart, 1975, Pages 35 et seq. In modems of data transmission technology, delay demodulators are essentially used at present, and a demodulation method which is known under the name "Zero Crossing Discriminator" or "Monoflop Demodulator" has achieved special importance.

In this method which is described on pages 123 to 125 in the above-mentioned literature reference, every zero crossing of the FSK receiving signal is marked with a spike pulse and at every zero crossing, a pulse of constant amplitude and given duration is generated by a monoflop, and the frequency-modulated input signal is thereby converted into a pulse width-modulated signal. From this signal, the low-frequency signal component is filtered out in a demodulator low pass filter connected thereto. This method and similar ones have the disadvantage that digital as well as analog functional units must be used to carry them out, the integration of which, particularly if LC or RC stages are used as the active low pass, raises technological problems. This applies particularly if a particularly low-power construction in CMOS technology is required.

It is accordingly an object of the invention to provide a method and apparatus for demodulating FSK signals, which overcomes the afore-mentioned disadvantages of the prior art methods and devices of this general type, which operates purely digitally, can therefore be easily carried out in full integration, and can in addition be used in a simple manner for different data rates.

With the foregoing and other objects in view there is provided, in accordance with the invention, a method for demodulating FSK signals in which zero crossings of the FSK signals are detected and processed further, including an address-generating logic and a memory connected to the address-generating logic, which includes delivering the FSK signals to the input side of the address-generating logic, controlling the address-generating logic with a given system clock frequency, supplying necessary address sequences from the address-generating logic to the memory for reading out a pulse reply from the memory, whereby in the memory are stored time-sequential values of a pulse reply having a given duration which emulates a digital non-recursive transversal filter having a lowpass transfer characteristic in response to an input pulse of given duration, supplying the necessary address sequences from the address-generating logic for assigning a definite counting address to each zero crossing on the input side which is not yet assigned to another zero crossing, which sequentially assumes all values for the given duration which are necessary for reading out the pulse reply ("response") from the memory and which assumes a rest value ("address") after the completion of the read out process, and summing up data read out from the memory during a given system clock period.

In this manner by summing up the pulse released by each zero crossing, it is possible to achieve the same filter effect from the stored pulse reply curve as with an analog filter known from the state of the art.

To reduce the number of components required, there is provided in accordance with the invention a method which comprises applying the counting addresses to the memory in time-multiplex operation, and setting the multiplex clock frequency at N-times the given system clock frequency, where N is the number of counting addresses.

In accordance with another mode of the invention, there is provided a method which comprises varying the transmission speed range of the method by changing the given system clock frequency.

In accordance with the device of the invention, there is provided an apparatus for implementing a method for demodulating FSK signals in which zero crossings of the FSK signals are detected and processed further, including a memory for storing values of a pulse reply following each other in time which emulates a digital non-recursive transversal filter having a lowpass transfer characteristic delivers responding to an input pulse of given duration; means for supplying a system clock frequency, an address-generating logic connected to the memory, the address-generating logic being controlled by the system clock frequency and being addressed by an FSK signal, the address-generating logic having at least as many counting addresses as zero crossings of the FSK signal that are maximally expected during a given time period $T_{IA}$, controlled by the system clock, assigning a definite counting address to each zero crossing which is not yet assigned to another zero crossing, the address-generating logic assuming all values being required for reading out the pulse reply from the memory for the duration of the given time being controlled by the system clock frequency, and the address-generating logic assuming a rest value after the completion of the readout process; an adding unit connected to the memory for forming the sum of all values read out from the memory in each given system clock period, and a digital threshold value switch connected to the adding unit.

In accordance with another feature of the invention, the memory is a ROM.

In accordance with a further feature of the invention, the memory has an address input, and the address-generating logic includes a full adder having first and second inputs and an output and a shift register having an input connected to the output of the full adder and an output connected to the address input of the memory and to the first input of the full adder, and a logic circuit connected to the second input of the full adder for registering a zero crossing of the FSK signal while a rest address is simultaneously present.

In accordance with an added feature of the invention, the memory has a data output, and the adding unit includes a further full adder having a first input connected to the data output of the memory, a second input and an output, a first flipflop circuit having D-inputs connected to the output of the further full adder and an output, and a second flipflop having D-inputs connected to the output of the first flipflop and an output, the output of the first flipflop being further connected to the second input of the further full adder.

In accordance with a concomitant feature of the invention, there is provided a comparator having a first input connected to the output of the second flipflop and a second input being addressable by a variable digital threshold value.

Other features which are considered as characteristic for the invention are set forth in the appended claims.

Although the invention is illustrated and described herein as embodied in a method and arrangement for demodulating frequency shiftkeyed signals, it is nevertheless not intended to be limited to the details shown, since various modifications and structural changes may be made therein without departing from the spirit of the invention and within the scope and range of equivalents of claims.

The construction and method of operation of the invention, however, together with additional objects and advantages thereof will be best understood from the following description of specific embodiments when read in connection with the accompanying drawings, in which:

FIG. 1 is a block flow chart diagram of an embodiment example of an arrangement for implementing the method according to the invention;

FIG. 2 is a block diagram of a zero crossing discriminator known from the state of the art;

FIGS. 3 to 8 are graphs showing the signals which occur at the individual blocks of the zero crossing discriminator according to FIG. 2;

Figures 9A, 9B:
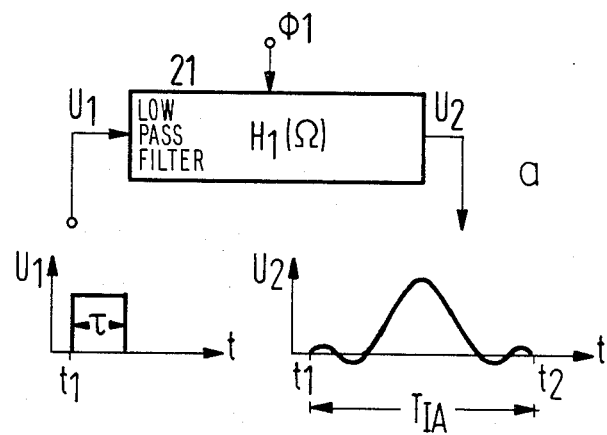
Figure 10:
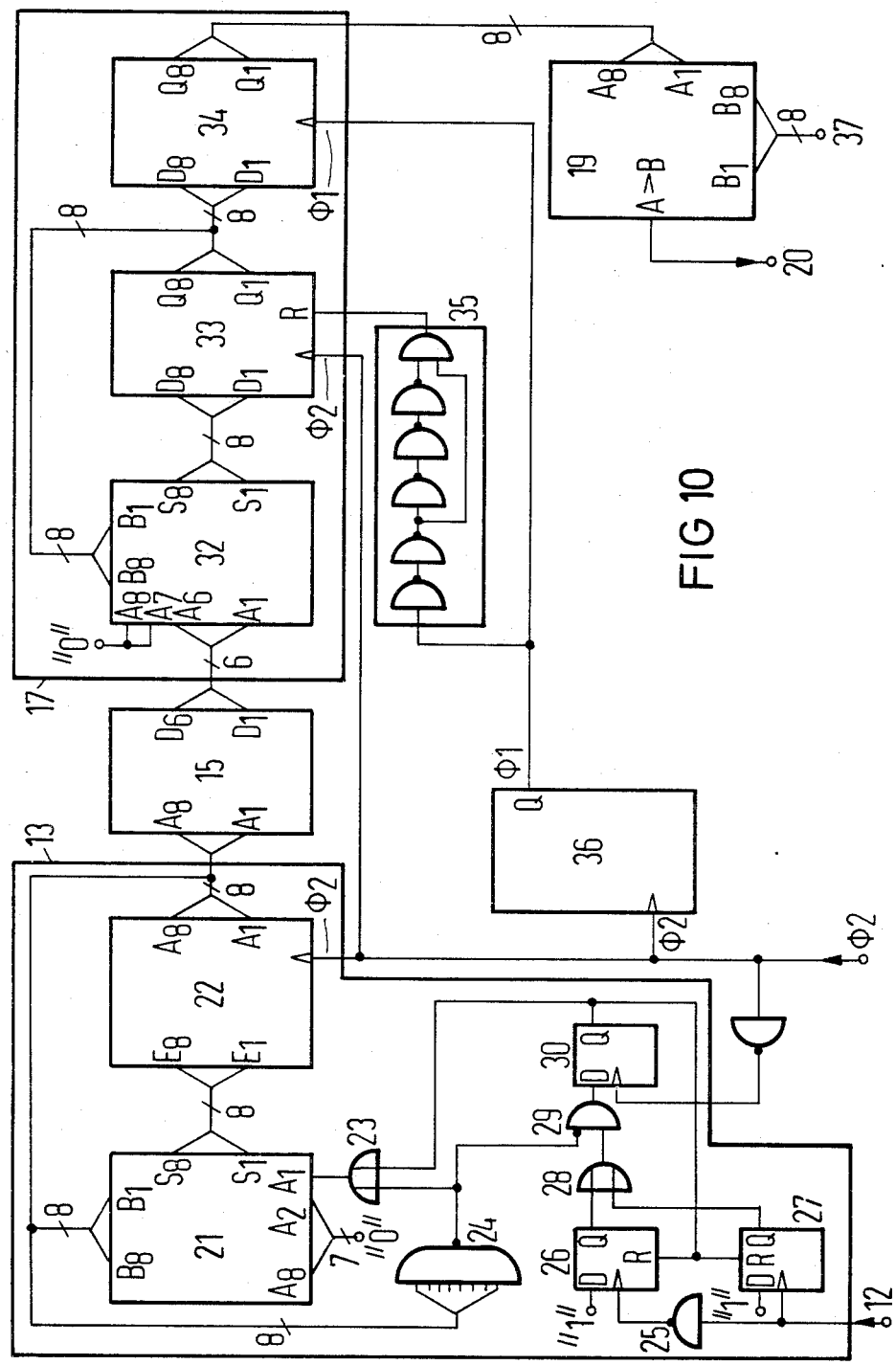

FIGS. 9a and b, respectively, are a block diagram and graphs showing the pulse response on a non-recursive digital filter; and FIG. 10 is a schematic and block circuit diagram of an embodiment example of an arrangement according to the invention.

Referring now to the figures of the drawing and first, particularly, to FIG. 2 thereof, there is seen a block diagram of a zero crossing discriminator which is known from the above-mentioned publication, on pages 123 to 125 thereof. FIG. 2 shows five functional blocks 7, 8, 9, 10 and 11. The signals present at the inputs and outputs 1, 2, 3, 4, 5 and 6 of the functional blocks are shown in FIG. 3 (input of a functional block 7 which is a threshold circuit for detecting zero level), FIG. 4 (output of the functional block 7), FIG. 5 (output of a functional block 8), FIG. 6 (output of a functional block 9), FIG. 7 (output of a functional block 10) and FIG. 8 (output of a functional block 11).

The functional blocks 7 and 8 serve a particular purpose which is to "mark" each zero crossing of the FSK signal 1 (shown in FIG. 3) present at the input of the functional block 7, by a needle spike. In the simplest case, the functional block 9 is provided in the form of a monoflop also known as a "one-shot" ("Monoflop-Demodulator"), which generates a pulse of constant amplitude and given duration $\tau$ for each zero crossing. The frequency-modulated input signal 1 is therefore converted at the output of the functional block 9 into a pulse width-modulated signal (PDM) 4 (FIG. 6). By means of the low-pass filter (Block 10, FIG. 2) the high frequency signal component from block 9 is suppressed. The base band signal recovered in this manner which still contains a certain amount of carrier, is fed to a threshold circuit (functional block 11) in order to regenerate the original data signal 6 (FIG. 8). This demodulator circuit is presently being used on a large scale in modems for data processing. The functional blocks 7, 10 and 11 are provided in this case in the form of analog circuits and the functional blocks 8 and 9 by digital circuits. However, the integration of the conventional demodulator circuit raises considerable technological problems, especially with respect to a realization in CMOS technology, by mixing digital and analog functional units.

The demodulation method according to the invention provides a remedy in this case. FIG. 1 shows a block diagram of a digital device for carrying out the method according to the invention. The memory 15 used in the device may, for instance, be a commercially available read-only memory (ROM). Stored in the memory are the consecutive values of a pulse reply (response) $U_2$ which, as shown in FIG. 9, would be furnished by a digital non-recursive transversal filter 21 with a given low pass transfer function $H_1(\Omega)$ in response to an input pulse $U_1$ with constant (normalized) amplitude and a given duration $\tau$. However, a pulse reply with any amplitude shape (for instance, a saw tooth, triangle pulse) could be stored in the memory 15 as well. The duration $T_{IA}$ of this pulse reply $U_2$ is obtained in a known manner from the number of filter coefficients, the clock frequency $\phi_1$ of the digital filter and the length $\tau$ of the input pulse.

Further stored in the memory 15 under a certain address R as a rest address, is a given value, such as the value zero. The functional block 13 shown in FIG. 1, the address-generating logic (AEL), is addressed on the input side thereof by the FSK signal 12 which may already be present in the rectangular form shown in FIG. 4. The address generator (AEL) 13 furnishes the address sequences which are required for reading out the pulse reply from the memory 15. The spacing in time between the zero crossing of the signal 12 to be demodulated determine the address generation in the address generating logic 13 as follows:

Within each clock period $\phi_1$ of the system clock, the address generator (AEL) 13 feeds the counting addresses $A_1$ to $A_N$ in time multiplex operation to the memory 15 through an address bus 14. The number N of counting addresses corresponds to the maximum number of zero crossings of the signal 12 during the time $T_{IA}$. Changes of the counting addresses can be made at the system clock $\phi_1$; the pulse $\phi_2$ (multiplex clock frequency) controls the multiplex operation.

Every zero crossing at the input of the address generator (AEL) has the effect of causing a definite counting address assigned to the zero crossing (for instance, initially the first or otherwise the next counting address not already assigned to a zero crossing) to assume all values which are necessary for reading out the pulse reply from the memory 15, for the time duration $T_{IA}$ controlled by the system clock $\phi_1$. If this reading out process is completed, this counting address assumes the value R as the rest address. It can then be "activated" again by a zero crossing.

Since a total of N different addresses can be applied in multiplex operation to the memory 15, the following relation is obtained for the maximum frequency $f_{Emax}$ of the signal to be demodulated which is still processed correctly:

$$f_{E\,max} = (N/2\,T_{IA})$$

During each clock period $\phi_1$, an adding unit 17 forms the sum of all N values which, while being controlled by the multiplex clock frequency $\phi_2$, are read out from the memory 15 during this time by way of a data bus 16, and makes these values available during the following clock period of $\phi_1$ at its output. Thus, a baseband signal 5 is available in digital (binary) form at the output of the adding unit 17 as a sequence in time of this sum in the form shown in FIG. 7.

The adding unit 17 is followed by a digital comparator 19 which serves the function of a digital threshold switch; if the sum formed by the adding unit 17 is larger than a given adjustable threshold value, its output assumes the logic state "high". In all other cases, the output state is a logical "low". The output 20 of the digital comparator 19 directly furnishes the demodulated data signal 6 in the form shown in FIG. 8.

Since the cutoff frequency of a digital filter is proportional to the sampling frequency, the demodulator device according to the invention can be adapted to different transmission speeds and characteristic frequencies by changing the clock frequency of the system clock $\phi 1$ and, since different output voltages are applied to the digital comparator 19 for different frequencies, by changing the digital threshold value in the comparator 19. Thus, it is possible, for instance, to demodulate for telephone transmission purposes at frequencies of 1300 and 2100 Hz, 1200 bits/second, as well as at frequencies of 1300 and 1700 Hz, 600 bits/second. This provides the capability of providing FSK modems of different speed classes with the same programmable integrated circuit.

An embodiment example of a device for carrying out the method according to the invention is shown in FIG. 10.

The address generator AEL 13 is substantially formed of an 8-bit full adder 21 and an 8×8 bit shift register 22 controlled by the clock frequency $\phi 2$. Outputs $S_1$ to $S_8$ of the full adder 21 are connected to inputs $E_1$ to $E_8$ of the shift register 22. Outputs $A_1$ to $A_8$ of the shift register 22 are connected to address inputs $A_1$ to $A_8$ of the memory 15 constructed as a 256×6 bit ROM, as well as to a first input $B_1$ to $B_8$ of the full adder 21 and to an 8-fold or 8 times NAND gate 24.

The FSK signal 12 has the rectangular wave form shown in FIG. 4 which can be obtained from the sinusoidal wave form shown in FIG. 3, such as by an overdriven operational amplifier without negative feedback. In order to detect every zero crossing, the signal 12 is fed to an OR gate 28 through a first D-flipflop 27, the D-input of which is set to "high" level and via an inverter 25 and a second D-flipflop 26, the D-input of which is set to "high" level. The output of the NAND gate 28 and the inverted output of the gate 24 act on the input side of an AND gate 29, the output of which is connected to the D-input of a third D-flipflop 30.

The flipflop 30 is controlled by the inverted clock frequency $\phi 2$ which is fed in externally. The output Q of the third D-flipflop 30 is connected on one hand to resetting inputs R of the flipflops 26 and 27 and, on the other hand, to a first input of an OR gate 23. The second input of the OR gate 23 is connected to the output of the gate 24. The output of the OR gate 23 is connected to the first bit digital $A_1$ of the second input of the full adder 21 and the other bit digits $A_2$ to $A_8$ are connected to zero. This changes a rest address into an active address while at the same time resetting the flipflops 26 and 27, if a zero crossing is present.

The adding unit 17 includes a further 8-bit full adder 32 and two flipflop circuits 33 and 34 each including eight parallel D-flipflops. The first six bits $A_1$ and $A_6$ of the first input of the full adder 32 are connected to data outputs $D_1$ to $D_6$ of the memory 15, and input bits $A_7$ and $A_8$ are set to zero. The outputs $S_1$ to $S_8$ of the full adder 32 are connected to D-inputs $D_1$ to $D_8$ of the first flipflop circuit 33 which serves as a buffer for decoupling. Outputs $Q_1$ to $Q_8$ of the flipflop circuit 33 are connected on one hand to second inputs $B_1$ to $B_8$ of the full adder 32 and, on the other hand, to D-inputs $D_1$ to $D_8$ of the second flipflop circuit 34. The first flipflop circuit 33 is controlled by the clock frequency $\phi 2$ and the second flipflop circuit 34 is controlled by the system clock frequency $\phi 1$ obtained by means of an 8-fold divider 36. The first flipflop circuit 33 is reset by the system clock frequency $\phi 1$ which is delayed by a propagation time delay device 35.

The comparator 19 is constructed as an 8-bit comparator. The first inputs $A_1$ to $A_8$ of the comparator are connected to the outputs $Q_1$ to $Q_8$ of the flipflop circuit 34, while the second inputs $B_1$ to $B_8$ can be addressed with an adjustable digital threshold value 37. Present at the output of the comparator 19 is a data signal 20 which assumes the "high" state if the value present at the first input exceeds the value present at the second input, in the form shown in FIG. 8.

The arrangement shown in FIG. 10 can be constructed from commercially available components or logic elements. It corresponds to only one of the conceivable embodiments for an arrangement for implementing the method according to the invention. If time multiplex operation of such an arrangement is to be dispensed with, a separate counter for every zero crossing maximally to be expected during the time $T_{IA}$, may also be provided, which acts on an identical ROM, where the data read out from the ROM's are subsequently added and fed to a threshold value switch.

The foregoing is a description corresponding to German Application No. P 31 21 444.4, dated May 29, 1981, the International priority of which is being claimed for the instant application, and which is hereby made part of this application. Any discrepancies between the foregoing specification and the aforementioned corresponding German application are to be resolved in favor of the latter.

I claim:

1. Method for demodulating FSK signals having a transmission speed range, in which zero crossings of the FSK signals are detected and processed further in an FSK demodulator including an address generator having an input side and a memory having a memory input side connected to the address generator, which comprises delivering the FSK signals to said input side of the address generator, controlling the address generator with a given system clock frequency, supplying necessary address sequences from the address generator to the memory for the process of reading out pulse responses from the memory, thereby reading out time-sequential values of a pulse response stored in the memory having a given duration which emulate the output of a digital non recursive transversal filter having a lowpass transfer characteristic in response to an input pulse to the filter of a given duration; the address generator supplying said necessary address sequences for sequentially supplying a respective address of said address sequences for each respective zero crossing to said memory input side, which generates sequentially any value for the given duration which is necessary for reading out the pulse responses from the memory and which further generates an address for a rest value after the completion of the read out process said FSK demodulator further including an adder for summing up pulse responses read out from the memory during a given system clock period.

2. Apparatus for implementing a method for demodulating FSK signals in which zero crossings of the FSK signals are detected and processed further, comprising a memory having a read out process and having sequentially stored values of a pulse response which emulate the output of a digital non-recursive transversal filter having a lowpass transfer characteristic in response to an input pulse to the filter of given duration $\tau$; means for supplying a system clock frequency; an address generator for generating addresses connected to said memory, said address generator being controlled by said system clock frequency and receiving the FSK signal, said address generator capable of generating at least as many addresses as the number of zero crossings of the FSK signal that are maximally expected during a time interval defined as the time lapse ($T_{IA}$) between two consecutive system clock pulses, said address generator operating to generate sequentially all addresses required for the readout process of the pulse responses from said memory for the duration of said time interval, said address generator further generating an address for a rest value after the completion of the readout process; an adder connected to said memory for forming the sum of all values read out from the memory during each said time interval; and a digital comparator having a threshold value connected to said adder.

3. Apparatus for implementing a method for demodulating FSK signals in which zero crossings of the FSK signals are detected and processed further, comprising a memory having a readout process and having sequentially stored values of a pulse response which emulate the output of a digital non-recursive transversal filter having a lowpass transfer characteristic, in response to an input pulse to the filter of given duration $\tau$; means for supplying a system clock frequency; an address generator for generating addresses connected to said memory, said address generator being controlled by said system clock frequency and receiving the FSK signal, said address generator capable of generating at least as many addresses as the number of zero crossings of the FSK signal that are maximally expected during a time interval defined as the time lapse ($T_{IA}$) between two consecutive system clock pulses, said address-generator operating to generate sequentially all addresses required for the read out process of the pulse responses from said memory for the duration of said time interval, said address generator further generating an address for a rest value after the completion of the readout process; an adder connected to said memory for forming the sum of all values read out from the memory during each said time interval; and a digital comparator having a threshold value connected to said adder; wherein said memory has an address input, and said address generator includes a full adder having first and second inputs and an output and a shift register having an input connected to the output of said full adder and an output connected to the address input of said memory and to the first input of said full adder, and a logic circuit connected to the second input of said fuller adder for registering a zero crossing of the FSK signal while a rest address is simultaneously present.

4. Apparatus according to claim 3, wherein said memory has a data output, and said adder connected to said memory includes a further full adder having a first input connected to the data output of said memory, a second input and an output, a first flipflop circuit having D-inputs connected to the output of said further full adder and an output, and a second flipflop having D-inputs connected to the output of said first flipflop and an output, the output of said first flipflop being further connected to the second input of said further full adder.

5. Apparatus according to claim 4, including a comparator having a first input connected to the output of said second flipflop and a second input being addressable by a variable digital threshold value.

* * * * *